US007877069B2

(12) United States Patent
Stantchev et al.

(10) Patent No.: US 7,877,069 B2
(45) Date of Patent: Jan. 25, 2011

(54) METHOD AND APPARATUS FOR MASKING PROGRAM CONTENT

(76) Inventors: George Stantchev, 15831 N. 33rd Pl., Phoenix, AZ (US) 85032; Ted Hartson, 13631 E. Montgomery Rd., Scottsdale, AZ (US) 85262

( * ) Notice: Subject to any disclaimer, the term of this patent is extended or adjusted under 35 U.S.C. 154(b) by 1308 days.

(21) Appl. No.: 10/907,583

(22) Filed: Apr. 6, 2005

(65) Prior Publication Data

US 2005/0227651 A1 Oct. 13, 2005

Related U.S. Application Data

(60) Provisional application No. 60/561,345, filed on Apr. 12, 2004.

(51) Int. Cl.
*H04B 1/18* (2006.01)

(52) U.S. Cl. ............. 455/183.2; 455/184.1; 455/185.1; 455/186.1

(58) Field of Classification Search ............. 455/183.2, 455/183.1, 130, 150.1–150.2, 161.1, 164.1, 455/165.1, 168.1, 179.1, 180.1, 181.1–186.1, 455/227, 267
See application file for complete search history.

(56) References Cited

U.S. PATENT DOCUMENTS

| | | | | |
|---|---|---|---|---|
| RE37,131 | E * | 4/2001 | Mankovitz | 455/66.1 |
| 6,385,434 | B1 * | 5/2002 | Chuprun et al. | 455/11.1 |
| 6,389,270 | B1 * | 5/2002 | Nohrden et al. | 455/161.1 |
| 6,563,893 | B2 * | 5/2003 | Smith et al. | 375/354 |
| 7,345,551 | B2 * | 3/2008 | Cha et al. | 331/30 |

* cited by examiner

*Primary Examiner*—Pablo N Tran

(57) ABSTRACT

A system and a method for providing an additional audio content at the input of the car radio (or other radio receiver) by tracking the available channels. The invention provides an invasive and non-invasive way of adding dominant audio content source to the existing car audio systems.

16 Claims, 3 Drawing Sheets

METHOD AND APPARATUS FOR MASKING PROGRAM CONTENT

CROSS-REFERENCES TO RELATED APPLICATION

This application claims the benefit of U.S. Provisional Application No. 60/561,345, filed Apr. 12, 2004.

FIELD OF THE INVENTION

The invention relates to methods and apparatus for providing additional content to car audio devices by masking and/or augmenting their original sources.

BACKGROUND OF THE INVENTION

The existing car radio systems consist in general the following blocks: antenna, selective front-end, discriminator/demodulator, stereo equalizer, power amplifier. The antenna is designed to receive FM modulated signals with vertical polarizations in various frequency bands as example for Broadcast-FM in the US is from 88 to 108 MHz. The selective front end is tuned to receive either the FM signals mentioned above or the AM sound broadcasting channels in the frequency band 540 to 1700 kHz. The FM discriminator stage converts the FM modulated high frequency in baseband analog signal amplified an equalized for best performance. The AM demodulator-detector detects the envelope of the modulated carrier and converts it to a baseband sound.

While the extant example deals with interconnection with a car radio it will be noted that such an application is viable for any similar receiver situated nearby the injection system specified above.

There are different ways of providing additional content to the user by using auxiliary sound reproducing devices as: CD player, MP3 player, Cassette player or using the independent auxiliary input, which is unavailable in most of the car radio systems.

Additional sound content to the user can be introduced by using sound to media adaptor to any of the mentioned above systems or direct wiring the auxiliary input. Using any of this ways will create very implementation specific system.

The present invention introduces a method and apparatus of masking and/or channeling the program materials provided by the user into the existing radio system trough the RF input of the receiver.

SUMMARY OF THE INVENTION

The present invention offers a method and apparatus of masking the radio station, which the radio is tuned to by replacing the of air signal with a local program content. Also the content will be available at any station when the user changes the local radio station tuning parameters.

This device can be coupled thru a directional coupler in the antenna lead or close coupled to the antenna itself.

The first concept is to use time as a variable to permit identification of the receiver's tuned frequency. Upon activation the device starts scanning sequence and effectively sets a timer lets say for example that we use 1 second per RF increment.

The device also listens (either across the speaker wiring or even acoustically) for a unique audio signature (mark) that signifies that the receiver is tuned to the frequency at which the box it currently sending. The tag that is recovered could be a discrete tone or any signal property that is within the passband of the radio's detector/audio circuit.

The device then computes the elapsed time from start of scan to signal recovery into RF increment steps and can thusly identify the input frequency. In the example if the RF step increment for the FM sound broadcast channel is 200 kHz up and the sequence started at 88.1 MHz and 5 seconds elapsed from "start" to "find" the receiver would be tuned to five time 200 kHz equals 1 MHz added to the start of 88.1 MHz thusly 89.1 MHz. A modest amount of propagation delay through the variations of receivers in the market can be reconciled and can be made inconsequential by the selection of the RF increment step time.

A further variation of this technique starts two stepped generators each with a unique modulation property (mark) the generators move at different speeds and/or in opposite directions. When the receiver detects the mark tones the separation in time of the tones and the order of their reception provide the necessary information to compute the frequency to which the receiver is tuned.

Also the receiver's frequency can be recovered directly from digital synthesizer circuitry used as FM/AM tone carrier. The tone (mark) is modulated to the carrier with proper modulation scheme in order to be detected from the receiver. The synthesizer receives the channel number for each step of the scanning from a look up table or tuning consequence. When the tone is detected the existing number from the look up table will be the detected channel number.

A potential problem occurs when the receiver is retuned by the user or it is going through a channel scan.

Introducing a "jamming" signal technique can solve this problem. It is simply that once the system is correctly tuned and settled in a jamming signal can be introduced to some or all of the remaining channels, which can be received within the tuning range of the receiver. The jamming signal has a unique modulation property so that if, in this case, if ever can be heard; the unit knows that it has lost contact with the receiver on the desired channel. The process of jamming a hundred or so FM or AM channels is daunting. That issue can be addressed switching a series of band pass filters into the input (this may require direct coupling as opposed to close coupling to the antenna as mentioned above) the radio bandwidth can effectively be segmented into blocks so that the jamming signals only are present for the channels within the activated block, if the receiver is tuned elsewhere it hears nothing but background noise.

Another way to recover the radio station without hearing the "jamming" signal is by continuously scanning all available channels. If the FM band from 88 to 108 MHz needs to be scanned with steps of perhaps 200 KHz. There will be look up table created where all the channel frequencies are placed. There is a synthesizer or similar circuitry that reads the look up table and generates carrier modulated with tone. This carrier "jumps" continuously to each frequency from the look up table. The frequencies may not be consequent but in a certain order that will allow scanning the most probable first (like example the memory buttons first). When the tone is detected in the receiver the channel frequency is taken out of the look up table and used from the original synthesizer to generate the carrier for the desired signal content. At the same time the second synthesizer continues to scan all the rest of the channels except the current one which will carry the content.

There is a third way of tracking the channels by using three synthesizers. There are two different tone modulated carriers that start scanning the desired band respectively from the bottom to the top and from the top to the bottom. This way they will meet and cross in the middle of the scale. When the tones are received and the channel identified the third synthesizer will lock at the recovered channel and will establish the content carrier. The two tracking carriers will continue tracking the desired band by skipping the current content channel.

ADVANTAGEOUS EFFECTS

The advantages of the invention are:

Accommodates independent media content source to the existing car audio capabilities;

Providing audio content to the car radio receiver without customizing it; i.e. the auto tracking front-end is universal for all radio and car brands;

The audio content is available at any station at any time even the station is changed by the operator;

Using tracking synthesizers (oscillators) simplifies and minimizes the hardware which results in price reduction;

DETAILED DESCRIPTION OF EMBODIMENTS

Figure 1:
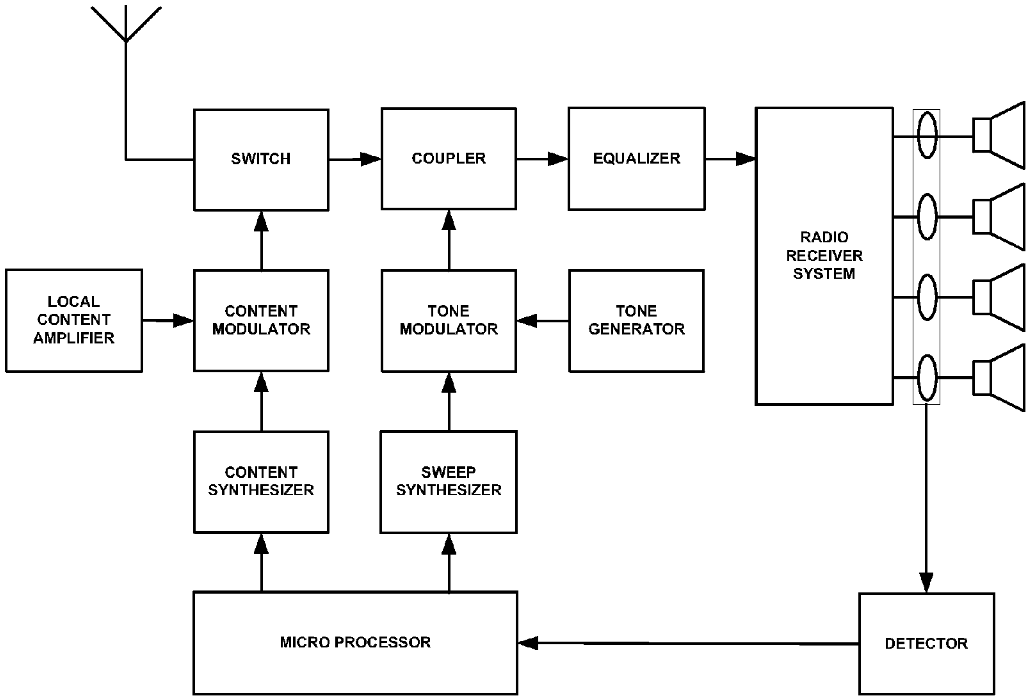
FIG. 1 Internal block diagram of the auto tracking front-end.

The block diagram of the tracking front end is shown at FIG. 1. The off air signal fed through the antenna is commutated by a switch with the program content from the audio modulator. A coupler that allows the signals from the sweep synthesizers to feed into the radio antenna input follows the switch. There is an equalizer that can adjust the input signal attenuation.

There are invasive and non-invasive ways to obtain signal feedback signal from the car speakers. This non-invasive implementation can be considered a magnetic coupling to the speaker signal or an acoustically listening to the speakers. As invasive feedback can be considered direct contact to the wires or using an adaptor.

The feedback signal from the speakers is multiplexed if necessary and detected. The detector verifies the tone signature and sends logic level to the processor when the tone is detected. The microprocessor monitors the speaker feedback and programs PLL device. The PLL has a dual function of providing sweep carrier to the sweep tone generator and/or providing a carrier for the audio modulator. The sweep tone generator can be realized as two or one tone sweep as described below. The audio modulator provides amplitude and/or frequency modulation upon the frequency band where the radio is tuned.

Figure 2:
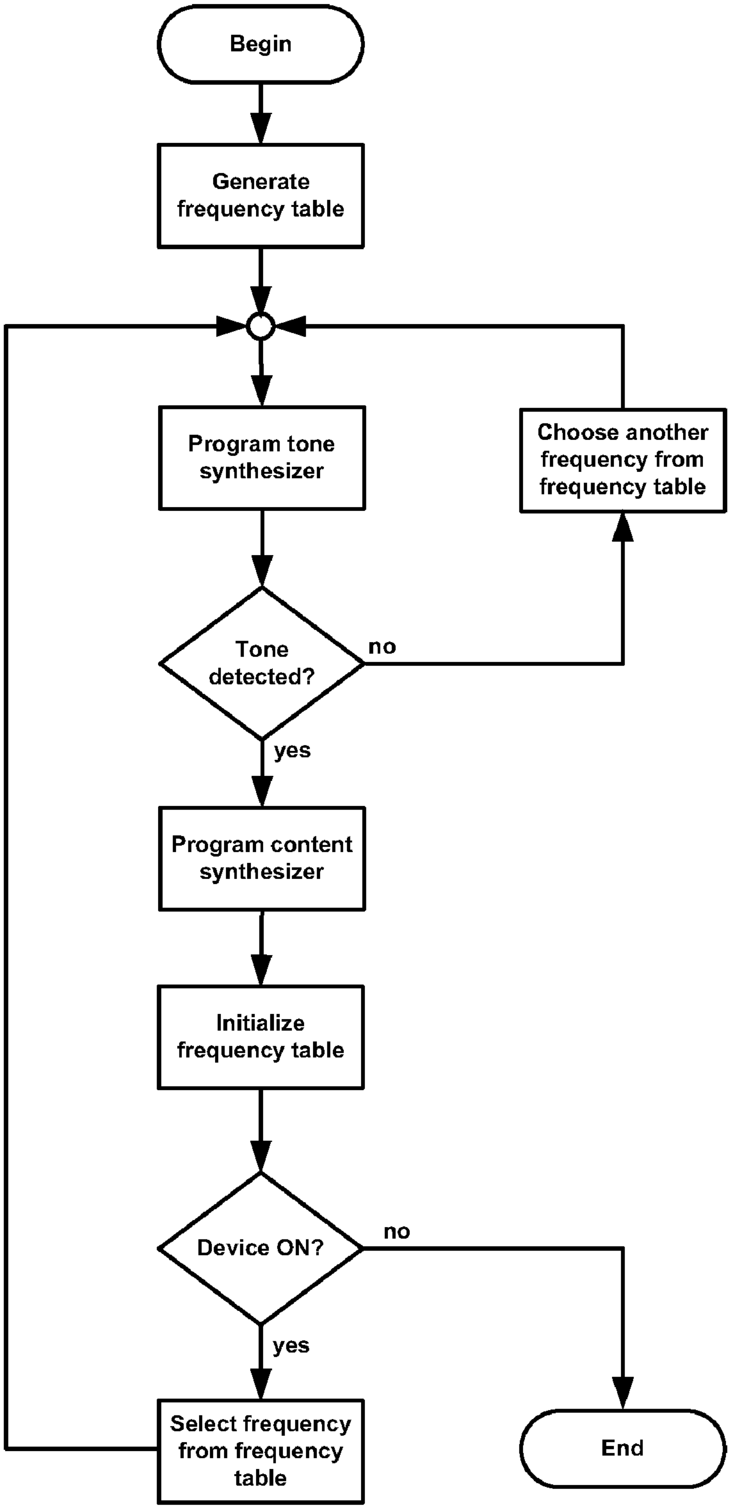
FIG. 2 Flowchart of the station-tracking algorithm with two synthesizers.

The flowchart (FIG. 2) showing algorithm by using two synthesizers—tracking and content represents the most common case of the tracking front-end. When the device is ON the frequency table (map) is created and the tones continuously loaded from the microprocessor to the first synthesizer, which starts the sweep. If there is no tone detected at the first frequency stop the synthesizer is programmed with the next value from the frequency map and so on until there is a detected tone signature. Then the current frequency value is used to program the second (content) synthesizer, which is the source of the modulation carrier feeding the audio modulator. The detected channel frequency is extracted from the frequency map. The first synthesizer continues to sweep along the rest of the frequencies in the look up table.

When the radio station is changed and the first synthesizer finds the channel, the microprocessor programs the second synthesizer to the new frequency and reinstates the frequency table as also extract the new channel frequency from there. The first synthesizer continues the sweep or hop along the rest of the frequencies while looking for a new station change.

Figure 3:
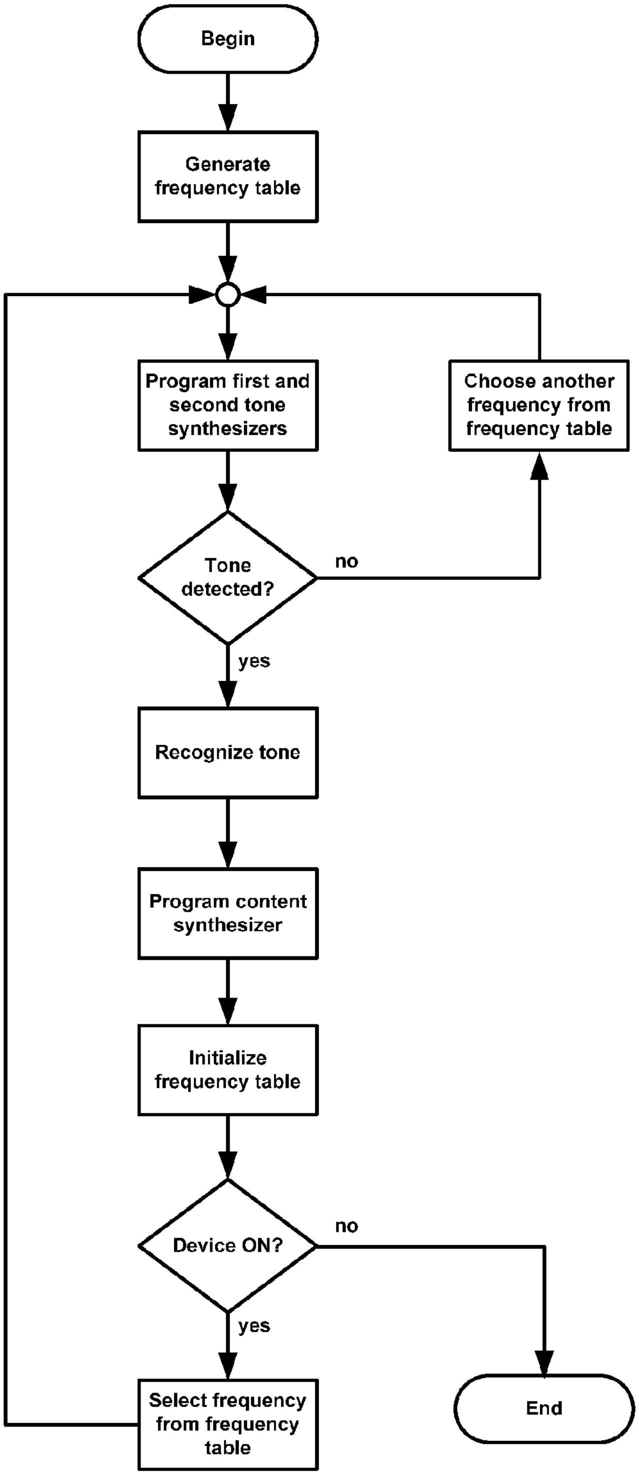
FIG. 3 Flowchart of the station-tracking algorithm with three synthesizers.

The flowchart (FIG. 3) shows an algorithm based on three synthesizers which allow twice shorter tracking time. There are two synthesizers that read from the same look up table. They may have different tones modulated on them as signatures. The algorithm is identical. When the device is ON the sweep starts. The first synthesizer sweeps from the top to the bottom and the second from the bottom to the top of the frequency band. If there is no tone detected, new frequencies are assigning to the synthesizers. The sweep continues until there is a tone detected. When the tone is detected the tone is analyzed for its signature and analyzed from which synthesizer it comes. When the synthesizer recognized the channel is being located. The microprocessor programs the third synthesizer with the recovered channel frequency and disables it from the look up tables. The sweep continues until the device is ON.

When the radio station is changed and one of the synthesizers find the channel, the microprocessor programs the third synthesizer to the new frequency and reinstates the frequency table as also extract the new channel frequency from there. The first and second synthesizers continue the sweep along the rest of the frequencies while looking for a new station change.

What is claimed is:

1. A unit for masking program content received from a radio receiver comprising:

a tone modulator coupled to a radio receiver input;

a frequency sweep synthesizer coupled to said tone modulator;

a tone generator coupled to said tone modulator;

a local content source coupled to a content synthesizer;

a content modulator coupled to said radio receiver input;

a detector coupled to a radio receiver output to detect said tone;

a microprocessor coupled to said detector and said synthesizers; and wherein said microprocessor is set to program wherein said content synthesizer from a frequency table to a channel frequency to replace said program content with local program content based on detected radio station frequency.

2. A unit according claim 1 for masking program content detecting a radio frequency channel where said radio receiver is tuned and replacing said channel with local program content.

3. A unit according claim 1, wherein said detector is indirectly coupled to said radio output to receive a feedback in a means of audio or electro-magnetic waves.

4. A unit according claim 1, wherein said detector is directly coupled to said radio output to receive directly electrical signals.

5. A unit according claim 1, wherein said microprocessor is configured to program said sweep synthesizer to sweep said radio receiver input and determine a channel frequency of currently tuned channel of said radio receiver based on time variable tracking.

6. A unit according claim 1, wherein said sweep synthesizer is modulated with sequence of tones called signature.

7. A unit according claim 1, wherein said sweep synthesizer is programmed to sweep said radio receiver input using a frequency table and said microprocessor is set to program said content synthesizer to a frequency from said frequency table.

8. A unit according claim 1, wherein said two sweep synthesizers are used and said sweep synthesizers are programmed to sweep said radio receiver input with frequencies from said frequency table and said microprocessor is set to program said content synthesizer to a frequency from said frequency table.

9. A unit according claim 1, wherein said synthesizer introduces a "jamming" signal to said radio receiver input, wherein said detector detects said "jamming" signal when said radio receiver channel is changed and said microprocessor programs said content synthesizer with said local content.

10. A unit according claim 1, wherein said two synthesizers are programmed to sweep said radio receiver input, wherein said two synthesizers are modulated with different tones or sequence of tones called signature.

11. A unit according claim 1, wherein said unit is directly coupled to said radio receiver input by means of using switch or directional coupler.

12. A unit according claim 1, wherein said unit is indirectly coupled to said radio receiver input by means of close coupling using antenna or mutual coupler.

13. A unit according claim 1, wherein said unit is coupled to said radio receiver input with a signal equalizer.

14. A unit according claim 1, wherein said unit provides a modulated local content via said content modulator at any station.

15. A unit according claim 1, wherein said unit is detecting said radio station frequency using frequency look up table.

16. A unit according claim 1, wherein said unit uses said sweep synthesizer with continues sweep to detect if said radio station channel is changed.

* * * * *